United States Patent [19]

Witzel

[11] Patent Number: 4,470,753
[45] Date of Patent: Sep. 11, 1984

[54] RADIAL BLOWER, ESPECIALLY FOR HEATERS OR AIR CONDITIONING SYSTEMS IN VEHICLES

[75] Inventor: Karlheinz Witzel, Stuttgart, Fed. Rep. of Germany

[73] Assignee: Suddeutsche Kuhlerfabrik Julius Fr. Behr GmbH & Co. KG, Fed. Rep. of Germany

[21] Appl. No.: 191,297

[22] Filed: Sep. 26, 1980

[30] Foreign Application Priority Data

Sep. 28, 1979 [DE] Fed. Rep. of Germany ....... 2939385
Dec. 27, 1979 [DE] Fed. Rep. of Germany ....... 2952407

[51] Int. Cl.$^3$ .............................................. F01D 5/00
[52] U.S. Cl. ..................................... 415/116; 415/87; 415/119; 416/181; 416/184
[58] Field of Search .................... 415/87, 116, 119; 416/93 R, 181, 184; 417/372, 366, 371; 98/38 R, 38 B, 38 C; 15/413; 310/62, 63; 215/533.31, 533.29, 512.15

[56] References Cited

U.S. PATENT DOCUMENTS

| 100,236 | 2/1870 | Sturtevant | 416/184 |
|---|---|---|---|
| 1,345,951 | 7/1920 | Phelp | 416/184 |
| 1,495,873 | 5/1924 | Schmelzer | 415/119 |
| 1,709,994 | 4/1929 | Moody | 415/116 |
| 2,073,489 | 3/1937 | Leathers | 15/413 X |
| 2,557,201 | 6/1951 | Punt | 415/119 |
| 2,943,639 | 7/1960 | Smith | 137/533.29 X |
| 3,463,189 | 8/1969 | Fitzpatrick | 137/512.15 X |
| 3,807,444 | 4/1974 | Fortune | 137/512.15 X |
| 3,829,722 | 8/1974 | Rosenthal, Jr. et al. | 310/62 X |
| 4,055,113 | 10/1977 | Monroe | 415/131 X |

FOREIGN PATENT DOCUMENTS

703412 of 1966 Italy ..................................... 15/413

Primary Examiner—Harvey C. Hornsby
Assistant Examiner—Christine A. Peterson
Attorney, Agent, or Firm—Craig & Burns

[57] ABSTRACT

A radial blower, especially for heaters and/or air conditioning systems of motor vehicles. The radial blower including a housing having a front portion provided with an air intake opening and a back portion provided with discharge or exit openings. The housing is adapted to accommodate a drive motor for a fanwheel which is manufactured as a one piece plastic part. The fanwheel includes a fan ring with fan blades and a hub. A spacer is provided for connecting the fan ring with the fan blades. A spacer is provided with openings having spokes disposed therebetween. The spokes constitute a bundle of springs connected in parallel. Openings in a back portion of the housing and/or the drive motor have a limited cross section for drawing in a sufficient flow of cooling air.

23 Claims, 8 Drawing Figures

RADIAL BLOWER, ESPECIALLY FOR HEATERS OR AIR CONDITIONING SYSTEMS IN VEHICLES

The present invention relates to a blower arrangement and, more particularly, to a radial blower for heaters and/or air conditioning systems of motor vehicles, with the blower including a housing having an air intake opening provided at a front thereof and exit or discharge openings at a rear end thereof, with the housing being adapted to accept a drive motor for a fanwheel which is made as a one-piece plastic component, which wheel includes a fan ring with fan blades and a hub connected by a spacer.

In constructing radial blowers of the aforementioned type as a so-called double-flow blower, an arrangement has been proposed wherein a spacer connecting the hub and fan ring is extended in a vicinity of the fan blades and divides the latter into two segments divided by the spacer. The spacer forms a partition both in the area of the fan blades and an area between the fan ring and the hub separating the drawn in air flow. Most of the air drawn in enters through the air intake opening located in front of the housing with the remainder of the air flow being drawn in through openings on the back of the housing and also serves as a flow cooling air to the fanwheel drive motor.

In the above-proposed construction, the segments of the fan blades are usually dimensioned axially so that approximately one-third of a total length of the fan blades serves to produce the partial air flow which includes the cooling air flow. While such double flow fans produce very good cooling results with a good overall blower performance, a disadvantage resides in the fact that the cost of the parts which cooperate with the fan, especially the air ducts, air valves, air valve controls as well as the space requirements are considerable. In fact, it is necessary to mount the air valves on both sides of the blower housing, that is, on the front and the back of the housing. This naturally also considerably increases the amount of space required for the overall installation.

Additionally, with such a double flow blower construction, it is not possible to produce a significantly different subdivision of the two air streams by using a different length ratio between the segments of the fan blades, since reducing the blade length to produce the cooling air flow would result in considerable loss of power.

Single flow radial blowers have also been proposed wherein an air intake on occurs through the air intake opening at the front of the housing. In such a construction, a cooling air flow is capped off from a spiral case downstream of a fanwheel through a sort of pitot tube and this trapped flow is fed back through the fan motor in a vicinity of the fanwheel. Therefore, this construction requires only one air valve arrangement and air valve control in a vicinity of the front of the housing so that manufacturing costs and the necessary space for installation are both reduced. However, since the necessary cooling air flow is tapped off from the total volume delivered by the fan, this flow of cooling air is lost to the total air flow and, additionally, the cooling effect is relatively limited.

In all such proposed radial blowers, vibrations of the fan blades constitute a known phenomenon which, in practice, leads to unpleasant noise being generated and sometimes even to the ultimate destruction of the fanwheel.

The aim underlying the present invention essentially resides in providing a radial blower of the aforementioned type which produces a good cooling effect on the drive motor, which reduces the required cost for associated parts, especially air valves and air valve controls, reduces the overall construction costs, and also minimizes if not avoids vibrations of the fan blade in a selected operating rpm range.

In accordance with advantageous features of the present invention, the spacer is provided with openings which have spokes located between them. The spokes constitute a bundle of springs connected in parallel with openings in the back of the housing and/or the drive motor having limited cross section in order to permit drawing in of sufficient cooling air.

By virtue of the above-noted features of the present invention, the fanwheel draws in air both through the air intake opening and through the back of the housing and the drive motor, without the fanwheel having to be divided into segments specifically intended for this purpose. Rather, the portions of the individual air flows are determined by the cross sectional areas of the openings in a vicinity of the back of the housing and/or the motor so that it is possible to control the flow of cooling air without affecting the delivery of the blower in such a way that, on the one hand, the motor is adequately cooled and, on the other hand, the cooling air flow relative to the total volume of air delivered by the blower amounts to a small fraction which does not play a critical role especially in a heater or air conditioning system for a motor vehicle nor have a deleterious effect on its function. Therefore, it is possible, in practice, to design this cooling air flow such that it can be disregarded and, consequently, special valve arrangements and valve controls are not required on the back of the blower housing.

Because the openings in the spacer allow for spokes, each consisting of a bundle of springs connected in parallel, the spacer acts as a spring element between the hub and the fan ring by means of which the vibrations generated by the drive motor may be de-coupled or removed from the fan ring so that no resonance is produced in the fan blades in a normal operating rpm range of the blower which could lead to a vibration of the fan ring and the fan blades as well.

In accordance with further features of the present invention, provision is made for equipping the motor with air ducts which pass axially therethrough so as to make it possible to achieve especially intensive cooling of the drive motor of the radial blower.

When, for example, the radial blower is used for ventilating passenger compartments of a motor vehicle and the intake opening is located beneath air intake slots disposed, as a rule, in front of the windshield, while its back terminates near the floor of the passenger compartment, it occurs that the radial blower is subjected to higher pressure than the intake side than in the area of the back of the housing. When the radial blower is employed is such an installation, the static pressure which develops in the area in front of the windshield during a travel produces an undesireable and uncontrolled back flow into the area near the floor of the vehicle. In order to avoid this effect, in accordance with further features of the present invention, the openings in the back of the housing and/or in the driver motor are provided with check valves which permit flow only toward the fanwheel.

Advantageously, the drive motor and/or an extension that surrounds the drive motor and supports the latter through connecting ribs may be enclosed by a cap with the check valves being disposed in the cap or cover.

Advantageously, the spacer of the present invention is shell-shaped and convex and surrounds that part of the drive motor which is located inside the housing. Advantageously, the spokes have a greater material thickness radially and axially than they do have circumferentially and the spokes extend axially over nearly an entire axial length of the fan ring.

The spokes may, for example, extend between a disc-shaped extension of a hub and a frustoconical ring which supports the fan ring. The spokes extend radially between the disc-shaped extension located in an axial center of the hub and an annular disc located between the fan blades are subdivided in an axial direction at the axial center.

The check valves of the present invention may be formed as elastic valves each associated with the openings. If the openings are provided in the cover part of a cap, the openings may be disposed centrally with respect to a center of the rotationally symmetrical cap and the valves may be construced as flap valves constructed in form of a membrane which is fastened only at its center.

Accordingly, it is an object of the present invention to provide a radial blower, especially for heaters and/or air conditioning systems in motor vehicles which avoids, by simple means, shortcomings and disadvantages encountered in the prior art.

Another object of the present invention resides in providing a radial blower, especially for heaters and/or air conditioning systems in motor vehicles which minimizes if not avoids the generation of unpleasant noises and vibrations.

Yet another object of the present invention resides in providing a radial blower especially for heaters and/or air conditioning systems of motor vehicles which ensures the flow of sufficient cooling air over the drive motor of the blower.

A still further object of the present invention resides in providing a radial blower, especially for heaters and/or air conditioning systems of motor vehicles which minimizes the need for employing special expensive valve arrangements and/or valve control arrangements.

A still further object of the present invention resides in providing a radial blower especially for heaters and/or air conditioning systems of motor vehicles, which is simple in construction and therefore relatively inexpensive to manufacture.

Yet another object of the present invention resides in providing a radial blower, especially for heaters and/or air conditioning systems in motor vehicles, which functions realiably under all operating conditions.

These and other objects, features, and advantages of the present invention will become more apparent from the following description when taken in connection with the accompanying drawings which show, for the purposes of illustration only, one embodiment in accordance with the present invention, and wherein:

Figure 1:
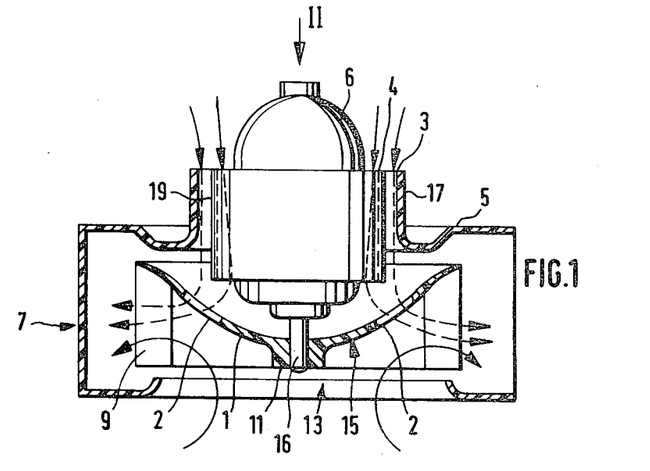
FIG. 1 is a schematic top view of a radial blower with an axially sectioned fanwheel constructed in accordance with the present invention.
Figure 2:
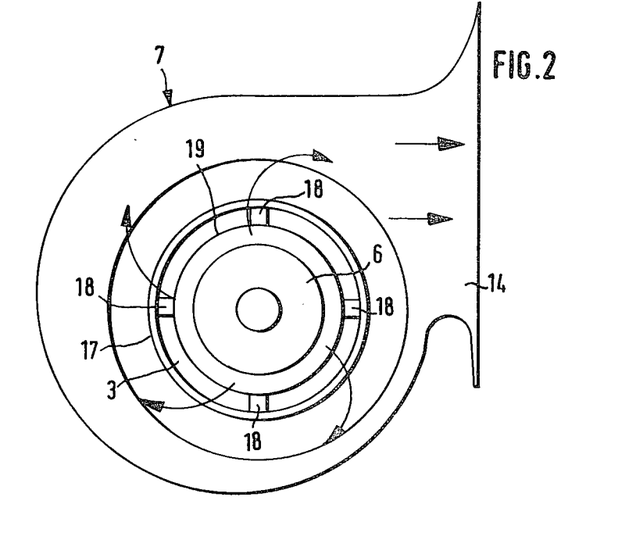
FIG. 2 is a frontal view of a fan wheel of the radial blower of FIG. 1 taken in the direction of the arrow II in FIG. 1.

Referring now to the drawings wherein like reference numerals are used through the several views to designate like parts and, more particularly, to FIGS. 1 and 2, according to these Figures, a housing generally designated by the reference numeral 7 includes an air intake generally designated by the reference numeral 13 and an air outlet or discharge generally designated by the reference numeral 14. The air outlet 14 is located in a circumferential area of the housing 4 and is arranged in a plane displaced through 90° with respect thereto. Advantageously, the housing 7 is formed of a plastic material and is composed of two halves. The housing 7, in the form of a spiral case, surrounds a fanwheel generally designated by the reference numeral 15 manufactured as a single plastic part especially by, for example, injection molding.

A fanwheel 15 has a hub 11 and a fan ring 9 connected thereto by a spacer 1 which spacer is essentially shell-shaped. The hub 11 is non-rotatably connected to a shaft 16 of an electric drive motor 6, which is mounted on a back wall 5 of the housing 7. The back wall 5 has a cylindrical extension 17 which accommodates one pole ring 19 of the drive motor 6 through ribs 18 in such a fashion that an air flow opening of a specified cross section is provided between the pole ring 19 and the cylindrical extension 17, which opening is in communication with the outside or surrounding environment. Additional air gaps are provided between the pole ring 19 and the inner part of the drive motor 6 especially for the windings through which gaps cooling air may flow.

The spacer 1 extends from the hub 11, located in a vicinity of the air intake 13, to the end of the fan ring facing the back wall 5 so that a single flow fanwheel results. The shell-shaped spacer 1 is provided with openings 2 in an area between the hub 11 and the fan ring 9 so that the fan ring 9 draws in air both in a vicinity of the air intake 13 and in a vicinity of the back wall 5 of the housing 7. The air flow drawn in a vicinity of the back wall 5 of the housing 7 is determined by the cross sectional areas of the air gaps located between the cylindrical extensions 17 and the pole ring 19 as well as between the pole ring 19 and the inner parts of the drive motor 6. By appropriately dimensioning these cross sections, the air flow may be adjusted to a value which is sufficient for good cooling of the drive motor 6 but is not so great by comparison with the total delivered air flow that must be taken into account in controlling the air supply in practical use when the radial blower is employed in heaters and/or air conditioning systems for motor vehicles. Advantageously, the radial blower can be constructed so that the cooling air flow is drawn in from an area near the floor of a motor vehicle so that ambient air and not fresh air is drawn in at this point. The air valve arrangement and air valve controls which are required for the heater and/or air conditioning systems of motor vehicles can therefore be limited to the vicinity of the air intake 13 in a manner conventional for single flow radial blowers. The cooling air flows are added to the air flow drawn in through the air intake opening 13 so that there is no reduction in the amount of air delivered by the radial blower.

The design of an electric motor is such that it has acceleration and deceleration phases which follow one another at short intervals and are transmitted to a fanwheel when the motor drives such a fan wheel. This is expecially true when a motor with a relatively small number of poles is used. These vibrations are transmitted to the fan blades where they take the form of torsional vibrations of the fan blades. If resonance results, such vibrations can lead to considerable noise being generated or even to the ultimate destruction of the fanwheel. In order to prevent the development of the resonance oscillations in a vicinity of the fan blades in an operating range of a radial blower, the spacer 1 located between the hub 11 and fan ring 9 is constructed as a spring element in a manner shown most clearly in FIGS. 3 and 4.

Figure 3:
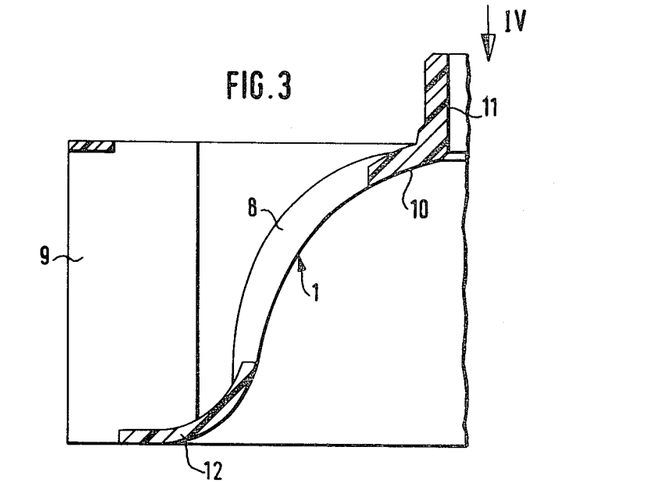
FIG. 3 is an axial cross sectional view, on an enlarged scale, through a fanwheel for a radial blower in accordance with the present invention.
Figure 4:
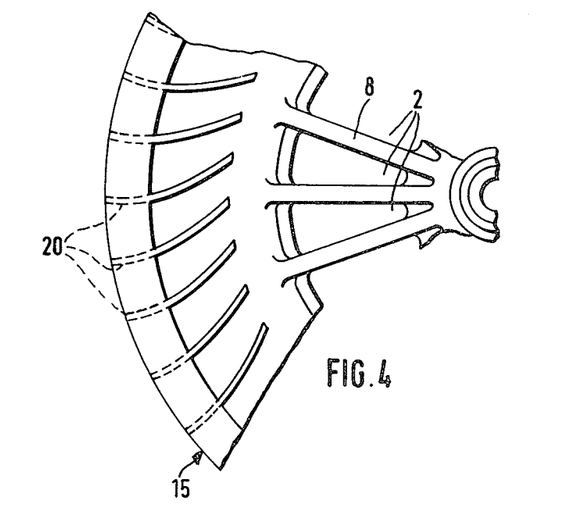
FIG. 4 is a partial view of the fanwheel in FIG. 3 taken in the direction of the arrow IV in FIG. 3.

As shown in FIGS. 3 and 4, the fanwheel 15 is provided with a hub 11 and a fan ring 9 connected together by the shell-shaped convex spacer 1. The fan ring 9 is composed of individual fan blades 20 which terminate radially at the circumference of the fanwheel 15. The blades are held at the end away from the hub 11, as viewed axially, by a ring 12 having an approximately frustroconical cross section and, at the other end, by an annular ring 21. Openings 2 in the spacer and area between a disc-shaped extension 10 and the frustoconical ring 12 are designed so that, as viewed axially, radially extending spokes 8 are produced forming a type of spring bundle. The spokes 8 permit deformation of the spacer 1 in a circumferential direction between the hub 11 and the fan ring 9 so as to produce a de-coupling which affects the transmission of vibration. By appropriate dimensioning the parts, it is possible to construct the spacer 1, which acts as a spring element, in such a fashion that no resonance vibrations develop in a vicinity of the fan blades 20.

To prevent the fan ring from wobbling, the spokes 8 are constructed as edge supports, that is, the spokes are thinner circumferentially than in the radial and axial directions.

As evident from the above, the spacer 1, located between the hub 11 and fan ring 9, in addition to connecting the two parts, satisfies two other functions, namely, to extend the sucking or drawing in action of the fan ring 9 to a vicinity of the back wall 5 of the housing 7 in addition to serving as the spring element. The shell-shaped form of the spacer 1 favorably results in the decoupling effect which extends practically over the entire axial length of the fan blades 20 and, as a result thereof, the spokes 8 are relatively long so that the deformation in a circumferential direction is facilitated.

Figures 5, 6:
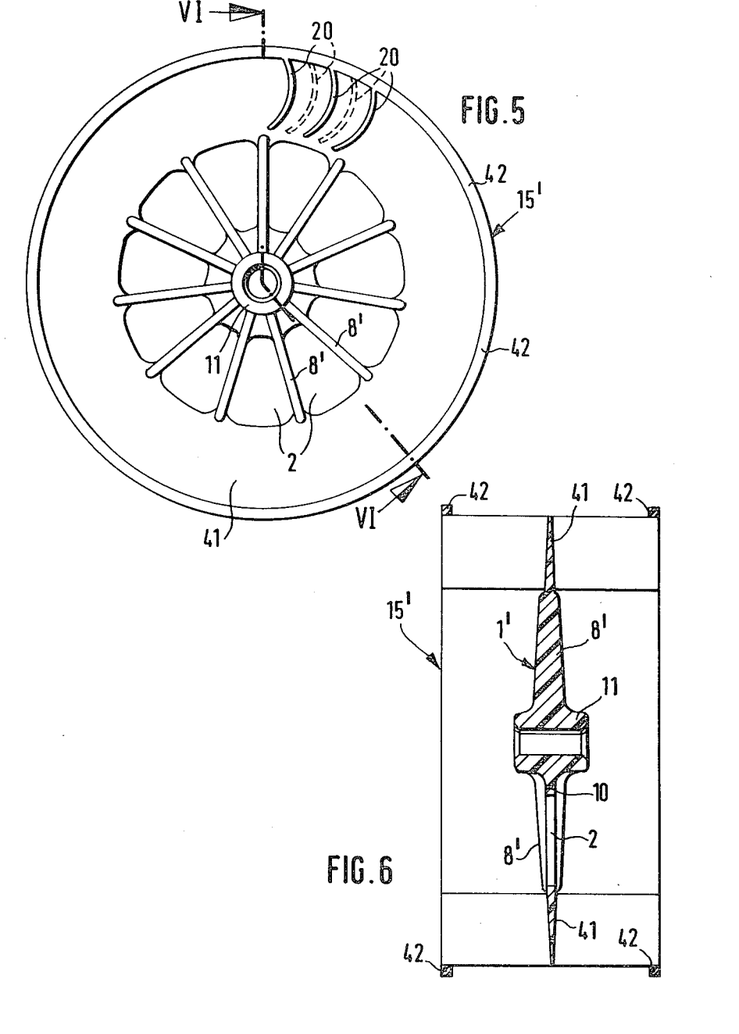
FIG. 5 is an axial view of a further embodiment of a fanwheel for a radial blower in accordance with the present invention.
FIG. 6 is a cross sectional view taken along the line VI—VI in FIG. 5.

However, it is also possible in accordance with the present invention to utilize a different construction for the spacer 1. More particularly, as shown in FIGS. 5 and 6, it is possible, for example, to arrange spacers generally designated by the reference numeral 1', in a conventional manner, in closed partitions in double flow fanwheels 15' resulting in radial spokes 8'. It is also possible to extend the spacer 1' as far as the radially outward edges of the fan blades 20 without producing a different function. The spacer 1', in the form of an annular disc 41, is provided between the parts of the fan blades 20 which are divided at the axial center and are displaced slightly with respect to one another in a circumferential direction. The fan blades 20 are held, at their outer edges, by a ring 42 which is approximately square and has a cross section which is rounded on the outside. The segments of the fan blades 20, which face the back wall 5, of the blower housing 7 may then be exposed to a flow coming from the air inlet or intake 13 so that the air which they draw in is not limited only to an area which faces the drive motor 6. The openings 2 in the partition, that is, in the spacer 1', produce a pressure equilibrium on the suction side between the partial air flows and/or halves of the fanwheel 15' so that the symmetry within the fanwheel 15 is restored with asymmetrical inward flow. The fanwheel 15' is independent of the rotational direction of the drive motor to the extent that it can be mounted in reverse fashion on the shaft 16 of the drive motor 6.

Providing openings 2 and leaving spokes can also be advantageous in double flow blowers provided with air ducts and air valves on the front and back of the housing since, in such a situation, if, for example, the valve on one side jams, the full blower capacity can still be produced since a correspondingly larger amount of air will then be drawn in on the other side.

Figures 7, 8:
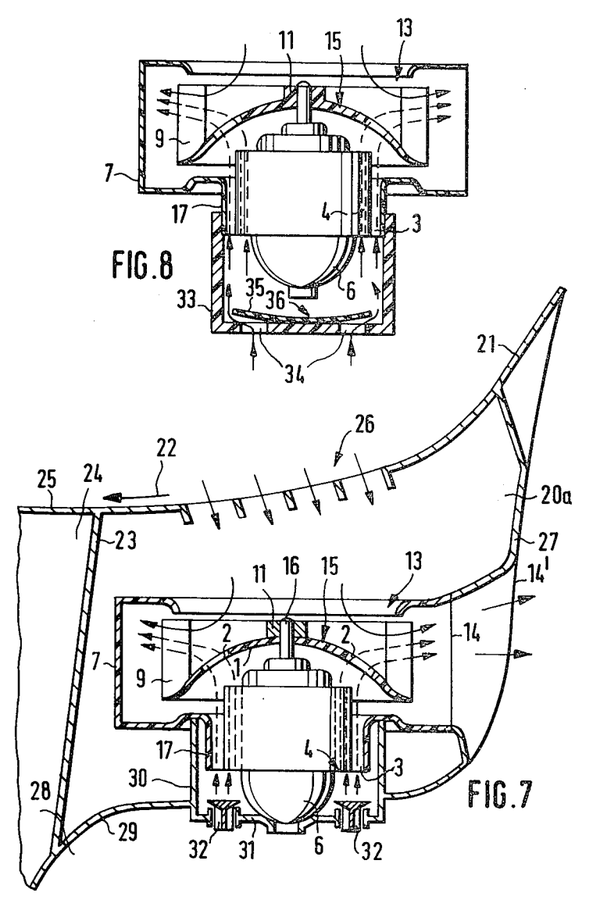
FIG. 7 is an axial cross sectional view through a radial blower with check valves mounted in a motor vehicle in an area in front of the windshield of the motor vehicle.
FIG. 8 is a cross sectional view of a further embodiment of a radial blower in accordance with the present invention provided with check valves.

As shown in FIG. 7, a radial blower, constructed in a manner similar to the radial blower of FIG. 1, is disposed in a space 20a located in front of a windshield 21 of a motor vehicle, with a direction of travel of the vehicle being indicated by the arrow 22. The space 20a is, in a conventional manner, separated from an engine compartment of the vehicle by a partition 23 and has an intake grille generally designated by the reference numeral 26 located at the top in a plane of a hood 25 of the vehicle. Air is drawn in through the grille 26 by the fanwheel 15. The air outlet or discharge 14 of the radial blower terminates in an opening 14' in a wall 27, with the opening 14' being located in a dashboard of the motor vehicle and, consequently, leading into a passenger compartment of the motor vehicle.

In a heating or air conditioning system for motor vehicles, a heater or a heater and an evaporator are provided, in a conventional manner, between the air exhaust or discharge 14 and the opening 14' in the wall 27. A floor area 28 of the passenger compartment is sealed off by a partition 29 with a hood 30 being mounted in the partition 29. The hood 30 surrounds the extension 17 and motor 6 on the outside and fits closely against the housing 7. The hood 30 has a cover part 31 which faces the floor area 28 of the passenger compartment. Check valves 32 are located in the cover part 31 with the valves being open when the radial blower is operating and permitting air to flow through the openings 3, 4 to the fanwheel 15. Thus, the radial blower in FIG. 7 works exactly as the radial blower described hereinabove in connection with FIGS. 1-6.

At higher operating speeds of the motor vehicle, a static pressure builds up in an area of the air intake grille 26 and therefore in the chamber 20a as well, with the pressure leading to an increased air through put at the air outlet or discharge 14 and also to an undesireable uncontrolled reverse flow through openings 3, 4 into the floor area 28, especially when the radial blower is not turned on. The check valves 32 are constructed so that, when a certain static pressure develops, the check valves 32 close the openings with which they are associated so that in this case no undesireable reverse flow may occur. Therefore, the advantage of the radial blower proposed herein is that it can be installed for vehicle ventilation even in locations where static pressure is generated by the relative wind and operating speed of the motor vehicle.

FIG. 8 provides a further modification and, according to this Figure, the radial blower is provided with a cover 33 in the shape of a cylindrical pot. The cover 33 is pushed over the extension 17 in such a manner that it produces a seal between the extension 17, which is likewise cylindrical in shape, and the cover cap 33, which is advantageously made of a slightly flexible plastic. The floor or bottom wall of the cover cap 33 which corresponds to the cover part 31 in FIG. 7, is provided with a plurality of openings 34 which are disposed symmetrically to an axis (not shown) of the drive motor 6 and cover cap 33. The openings 34 are made, for example, as slots arranged concentrically to the axis or as round openings.

The openings 34 are adapted to be covered, on an inside thereof, by an elastic rubber disc 35 fastened in a vicinity of its center to points generally designated by the reference numeral 36 on the cap 33. In the illustrated position, a slight negative pressure prevails inside the cap 33 relative to the floor area 28 because of the rotating fan wheel 15. Therefore, an appropriately constructed rubber membrane 35 rises permitting the cooling air to flow through the openings 3, 4 in the motor 6 to the fanwheel 15. When a positive pressure develops inside the cover cap 33, the membrane 35 closes the openings 34 preventing outside air from flowing into the floor area.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:
1. A radial blower, especially for heating or air conditioning systems of a motor vehicle, the blower comprising
drive motor means having a back,
a housing means having a back, said housing means accommodating the drive motor means,
an air intake means provided in a front of the housing means,
an air discharge means provided in a side of the housing means, and
a fanwheel means adpated to be driven by the drive motor means, the fanwheel means comprising a hub means and fan blades, the axial ends of which are connected with one another by means of a fan ring,
spoke means for connecting the fan ring to the hub means,
a plurality of spaced openings in the spoke means,
the spoke means forming a bundle of parallel connected springs for flexing in a circumferential direction of the fan wheel,
further openings in at least one of the back of the housing means and the drive motor means, the further openings having a predetermined limited cross section for enabling a drawing in of a sufficient flow of cooling air,
the fanwheel means is formed as a one piece part of a plastic material, and
the spoke means have a greater radial and axial material thickness than a circumferential material thickness.

2. A radial blower, especially for heating or air conditioning systems of a motor vehicle, the blower comprising
a drive motor means having a back,
a housing means having a back, said housing means accommodating the drive motor means,
an air intake means provided in a front of the housing means,
an air discharge means provided in a side of the housing means, and
a fanwheel means adapted to be driven by the drive motor means, the fanwheel means comprising a hub means and fan blades, the axial ends of which are connected with one another by means of a fan ring;
a spacer means for connecting the fan ring to the hub means,
a plurality of spaced openings in the spacer means,
spoke means disposed between the respective openings forming a bundle of parallel connected springs for flexing in a circumferential direction of the fan wheel, further openings in at least one of the back of the housing means and the drive motor means, the further openings having a predetermined limited cross section for enabling a drawing in of a sufficient flow of cooling air,
the fanwheel means is formed as a one piece part of a plastic material, characterized in that
the spoke means have a greater radial and axial material thickness than a circumferential material thickness, and
the spoke means extend axially over substantially an entire radial width of the fan ring.

3. A radial blower according to claim 1, characterized in that axially extending air duct means are provided in the drive motor means.

4. A radial blower according to one of claims 1 or 3, characterized in that the spoke means has a convex shell-shape and surrounds a portion of the drive motor means located inside the housing mens.

5. A radial blower means according to claim 1, characterized in that the hub means includes a disk-shaped extension, frustoconical ring means is provided for supporting the fan ring, and in that the spoke means extend between the disk-shaped extension and the frustoconical ring means.

6. A radial blower according to claim 5, characterized in that the hub means includes a disk-shaped extension located in an axial center thereof, the fan blades are subdivided in an axial direction at the axial center, an annular disk is located between the fan blades, and in that the spoke means extend radially between the disk-shaped extension and the annular disk.

7. A radial blower according to claim 6, characterized in that the back of the housing means is provided with an extension portion for surrounding the drive motor means, and in that connecting rib means are provided for supporting the drive motor means in the extension portion of the housing means.

8. A radial blower according to claim 7, characterized in that check valve means are provided for controlling a flow of cooling air through the further openings.

9. A radial blower according to claim 8, characterized in that a cap means is provided for covering at least one of the drive motor means or the extension portion of the housing means, and in that the check valve means is disposed in the cap means.

10. A radial blower according to claim 9, characterized in that the check valve means are formed as elastic valves associated with the respective further openings.

11. A radial blower according to claim 10, characterized in that the cap means includes a cover portion, and in that the further openings are disposed in the cover portion.

12. A radial blower according to claim 11, characterized in that the cap means is symmetrical, the further openings are disposed symmetrically with respect to a center of the cap means, and in that the elastic valves are formed as a membrane fastened in a center area thereof.

13. A radial blower according to one of claims 3 or 5, characterized in that the back of the housing means is provided with an extension portion for surrounding the drive motor means, and in that connecting rib means are provided for supporting the drive motor means in the extension portion of the housing means.

14. A radial blower according to one of claims 3 or 5, characterized in that check valve means are provided for controlling a flow of cooling air through the further openings.

15. A radial blower according to claim 14, characterized in that a cap means is provided for covering at least one of the drive motor means or an extension portion of the housing means, and in that the check valve means is disposed in the cap means.

16. A radial blower according to claim 9, characterized in that the check valve means are formed as elastic valves associated with the respective further openings.

17. A radial blower according to claim 16, characerized in that the cap means includes a cover portion, and in that the further openings are disposed in the cover portion.

18. A radial blower according to claim 15, characterized in that the cap means is symmetrical, the further openings are disposed symmetrically with respect to a center of the cap means, and in that the check valve means is fashioned as a membrane which is adapted to be supported in a center area thereof.

19. A radial blower, especially for heating or air conditioning systems of a motor vehicle, the blower comprising
  drive motor means,
  a housing means having a back, said housing means accommodating the drive motor means,
  an air intake means provided in a front of the housing means,
  an air discharge means provided in a side of the housing means, and
  a fanwheel means formed as a one piece part of a plastic material and adapted to be driven by the drive motor means, the fanwheel means comprising a hub means and fan blades, the axial ends of which are connected with one another by means of a fan ring,
  one row of spoke means for connecting the fan ring to the hub means,
  said row of spoke means forming a bundle of spring means flexible in a circumferential direction of the fan wheel,
  further openings in the back of the housing means, the further openings having predetermined limited cross section for enabling a drawing in of a sufficient flow of cooling air.

20. A radial blower, for heating or air conditioning systems of a motor vehicle, the blower comprising
  drive motor means,
  a housing means having a back, said housing means accommodating the drive motor means,
  an air intake means provided in a front of the housing means,
  an air discharge means provided in a side of the housing means,
  a fanwheel means driven by the drive motor means, the fanwheel means comprising a hub means and fan blades, the axial ends of whih are connected with one another by means of a fan ring,
  means connecting the fan ring to the hub means for imparting flexibility in a circumferential direction therebetween to vibrationally decouple the fan ring from the hub means,
  further openings in the back of the housing means, the further openings having a predetermined limited cross section for enabling a drawing in of a sufficient flow of cooling air.

21. A radial blower according to claim 20, wherein the means connecting the fan ring to the hub means comprises
  a bundle of springs disposed in a row about said hub and flexible in a circumferential direction of the fan wheel.

22. A radial blower according to claim 20, wherein the means connecting the fan ring to the hub means serves as the sole structure connecting fan ring and hub means to allow air input to the fan wheel means from two opposite directions parallel to the axis of the hub means.

23. A radial blower, especially for heating or air conditioning systems of a motor vehicle, the blower comprising
  drive motor means having a back,
  a housing means having a back, said housing means accommodating the drive motor means,
  an air intake means provided in a front of the housing means,
  an air discharge means provided in a side of the housing means, and
  a fanwheel means adapted to be driven by the drive motor means, the fanwheel means comprising a hub means and fan blades, the axial ends of which are connected with one another by means of a fan ring,
  means for vibrationally decoupling the drive motor means and hub means from the fan ring and comprising spoke means solely for connecting the fan ring to the hub means,
  a plurality of spaced openings in the spoke means,
  the spoke means forming a bundle of parallel connected springs for flexing in a circumferential direction of the fan wheel to damp transmission of vibrations from the hub to the fan ring, further openings in at least one of the back of the housing means and the drive motor means, the further openings having a predetermined limited cross section for enabling a drawing in of a sufficient flow of cooling air, the fanwheel means is formed as a one piece part of a plastic material, and the spoke means have a greater radial and axial material thickness than a circumferential material thickness.

* * * * *